United States Patent
Davis et al.

(10) Patent No.: US 8,345,701 B1
(45) Date of Patent: Jan. 1, 2013

(54) MEMORY SYSTEM FOR CONTROLLING DISTRIBUTION OF PACKET DATA ACROSS A SWITCH

(75) Inventors: Greg W. Davis, Liberty Lake, WA (US); Alan B. Mimms, Spokane, WA (US)

(73) Assignee: F5 Networks, Inc., Seattle, WA (US)

(*) Notice: Subject to any disclaimer, the term of this patent is extended or adjusted under 35 U.S.C. 154(b) by 1213 days.

(21) Appl. No.: 10/921,429

(22) Filed: Aug. 17, 2004

Related U.S. Application Data (60) Provisional application No. 60/497,788, filed on Aug. 26, 2003.

(51) Int. Cl.
  *H04L 12/28* (2006.01)
(52) U.S. Cl. ......... 370/412; 370/416; 370/417; 370/418
(58) Field of Classification Search .................. 370/235, 370/412, 413
  See application file for complete search history.

(56) References Cited

U.S. PATENT DOCUMENTS

| | | | | |
|---|---|---|---|---|
| 4,922,486 A * | 5/1990 | Lidinsky et al. | ............... | 370/427 |
| 5,768,257 A * | 6/1998 | Khacherian et al. | .......... | 370/229 |
| 5,999,518 A * | 12/1999 | Nattkemper et al. | ......... | 370/258 |
| 6,044,061 A * | 3/2000 | Aybay et al. | ................... | 370/230 |
| 6,065,092 A * | 5/2000 | Roy | .................................. | 711/5 |
| 6,144,640 A * | 11/2000 | Simpson et al. | .............. | 370/236 |
| 6,160,812 A * | 12/2000 | Bauman et al. | ............... | 370/416 |
| 6,317,415 B1 * | 11/2001 | Darnell et al. | ................ | 370/230 |
| 6,424,659 B2 * | 7/2002 | Viswanadham et al. | ...... | 370/469 |
| 6,438,102 B1 * | 8/2002 | Chui et al. | ..................... | 370/229 |
| 6,470,021 B1 * | 10/2002 | Daines et al. | ................. | 370/422 |
| 6,603,771 B1 * | 8/2003 | Raza | ............................. | 370/412 |
| 6,618,379 B1 * | 9/2003 | Ramamurthy et al. | .. | 370/395.41 |
| 6,625,177 B1 * | 9/2003 | Raza | ............................. | 370/522 |
| 6,789,154 B1 * | 9/2004 | Lee et al. | ....................... | 710/315 |
| 6,920,146 B1 * | 7/2005 | Johnson et al. | ............... | 370/415 |
| 6,959,002 B2 * | 10/2005 | Wynne et al. | ................. | 370/412 |
| 7,023,807 B2 * | 4/2006 | Michels et al. | ............... | 370/238 |
| 7,286,566 B1 * | 10/2007 | Parruck et al. | ................ | 370/474 |
| 7,856,026 B1 * | 12/2010 | Finan et al. | .................... | 370/412 |

* cited by examiner

*Primary Examiner* — Robert Wilson
*Assistant Examiner* — Brian O Connor
(74) *Attorney, Agent, or Firm* — LeClairRyan, a Professional Corporation (57) ABSTRACT

A memory system for ingress processing is arranged to access multiple banks in a time interleaved fashion. Each memory bank has an associated memory bank manager, which is arranged to track the contents and egress ports associated with data stored in the memory bank. Incoming data from ingress traffic is evaluated and segregated based on criteria. One of the memory banks is identified based on the criteria, and the incoming data is stored in the identified memory bank in the next available write cycle timeslot. Data constructs in the memory bank manager are updated to indicate the location and egress port associated with the stored data. The memory bank managers submit egress transmit bids to a master scheduler, which controls access to the memory banks. The memory banks are readout in interleaved fashion such that the effective average traffic arrival rate is increased and memory bandwidth requirements are reduced.

22 Claims, 6 Drawing Sheets

MEMORY SYSTEM FOR CONTROLLING DISTRIBUTION OF PACKET DATA ACROSS A SWITCH

CROSS REFERENCE TO RELATED APPLICATIONS

This patent application claims the benefit under 35 USC §119(e) of the filing date for U.S. Patent Application No. 60/497,788, which was filed on Aug. 26, 2003.

FIELD OF THE INVENTION

The present invention is related to ingress processing for a switch fabric. More particularly, the present invention is related to a memory system for ingress processing that allows access to multiple banks for efficient memory bus transfers.

BACKGROUND OF THE INVENTION

Various networking devices such as switches and routers are often arranged to buffer network traffic to provide better performance. As the incoming traffic to the network device increases in speed, the processing circuitry in the network device reaches a limit where it cannot process the incoming data fast enough. Instead of discarding the excess traffic, it is buffered and processed later.

Some networking devices have multiple input ports with a single output port. The output port reaches a physical speed limit when the total traffic entering the input ports exceeds the speed of the output port. This type of speed limit is referred to as congestion. When congestion is temporary, the network data packets can be buffered up and then smoothly transmitted over time. However, network data packets can be lost when the congestion persists over long periods of time.

Networking devices often use switch fabrics to transfer data from the ingress ports to egress ports. Buffering is often placed at the ingress ports of the switch fabric. The input buffers may be arranged as first-in first-out (FIFO) queues, or as first-in random-out (FIRO) queues. A FIFO queue that is operated without a scheduling algorithm may cause head-of-line blocking to occur. For example, when 'k' packets are buffered in a FIFO queue, only one packet is allowed to pass through, and 'k-1' packets must wait for the next cycle. In the meantime, while one of the 'k-1' cells waits for its turn, other packets are queued in the buffer and blocked from reaching a possibly idle output port in the switch fabric. To avoid head-of-line blocking, it is generally accepted that the data should be grouped in queues based on the egress port.

Figure 5:
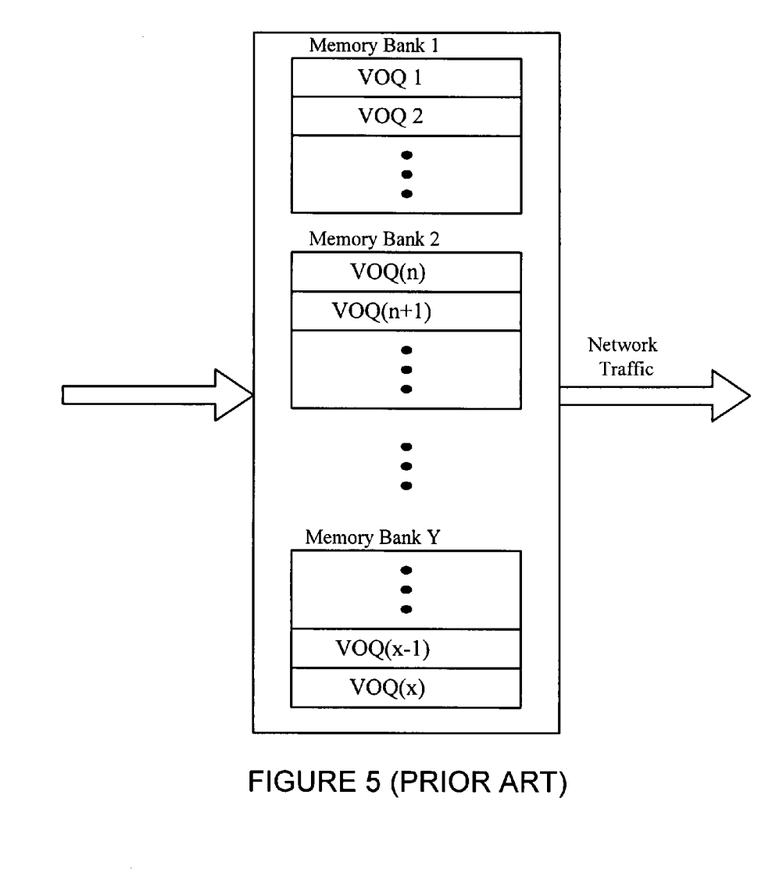
FIG. 5 is an illustration of a conventional virtual output queue.

When data is buffered at the ingress ports and separated into queues on-behalf of the egress ports, it is referred to as Virtual Output Queuing (VOQ). Some network devices utilize multiple banks of memory to provide buffering. As shown in FIG. 5, multiple (Y) banks of memory may be used to provide multiple virtual output queues. The ingress traffic is analyzed to determine the appropriate output port assignment. Ingress traffic is then buffered in the appropriate queue.

SUMMARY OF THE INVENTION

According to one aspect of the present invention, an apparatus is related to buffering incoming data for a switch fabric. The apparatus includes a traffic classification and segregation block, a first memory bank, a second memory bank, a first memory bank manager block, a second memory bank manager block, and a master scheduler block. The traffic classification and segregation block is configured to receive the incoming data. The first memory bank is arranged to selectively store the incoming data when write enabled, and also arranged to selective output stored data when read enabled. The second memory bank is arranged to selectively store the incoming data when write enabled, and also arranged to selective output stored data when read enabled. The first memory bank manager block is arranged to track data that is stored in the first memory bank based on egress port. The second memory bank manager block is arranged to track data that is stored in the second memory bank based on egress port. The master scheduler block is arrange to receive egress transmit bids from the memory bank manager blocks, and schedule read enable signals and write enable signals to the memory banks such that the timing to the memory banks are interleaved for maximum aggregate bus efficiency.

According to another aspect of the present invention, another apparatus is related to buffering incoming data for a switch fabric. The apparatus includes a plurality of memory banks, a master scheduler block, a means for classifying, a means for identifying, a means for buffering, and a means for maintaining. The plurality of memory banks is accessible via enable signals. The master scheduler block that is arranged to access the plurality of memory banks in an interleaved fashion. The means for classifying is arranged to classify the incoming data. The means for identifying is arranged to identify one of the plurality of memory banks based on the classification of the incoming data. The means for buffering is arranged to buffer the incoming data in the identified memory bank. The means for maintaining is arranged to revise a data construct when the incoming data is buffered in the identified memory bank, where the data construct indicates the memory location of the buffered data and the associated egress port.

According to a further aspect of the present invention, the master scheduler block comprises: a means for receiving, a means for evaluating, a means for reviewing, a means for scheduling, a means for enabling, and a means for reporting. The means for receiving is arranged to receive egress transmit bids. The means for evaluating is arranged to evaluate the egress transmit bids. The means for reviewing is arranged to review memory timings for the plurality of memory banks. The means for scheduling is arranged to schedule read cycles for the plurality memory banks such that each read cycle occurs in a particular timeslot for interleaved memory access, wherein the scheduled read cycles are based on at least the egress transmit bids and the memory timings. The means for enabling is arranged to enable read cycles for each memory bank during the scheduled read cycles. The means for reporting is arranged to report read cycle completion to the means for updating.

According to still another aspect of the present invention, a method is related to buffering incoming data to a switch fabric. The method includes: classifying the incoming data, determining an egress port that is associated with the incoming data, identifying one of a plurality of memory banks based on the classification of the incoming data, scheduling memory access with a master scheduler block such that the plurality of memory banks are accessed according to scheduled timeslots in an interleaved fashion, storing the incoming data in the identified memory bank during the scheduled timeslot that is associated with the identified memory bank, maintaining data constructs for each of the plurality of memory banks with a corresponding memory bank manager block, wherein each data construct includes virtual output queues that are associated with egress ports, wherein each entry in a particular virtual output queue identifies a memory location that is associated with the stored data in a particular memory bank, sending egress transmit bids to the master scheduler from each memory bank manager to request readout access from each of the plurality of memory banks, reading from each of the plurality of memory banks during a respectively scheduled access timeslot, coupling the readouts from each of the plurality of memory banks to the switch fabric during each respectively scheduled access timeslot, and communicating completed access cycles to the memory bank managers such that the data constructs are updated by the memory bank managers.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Briefly stated, the present invention is related to a memory system for ingress processing is arranged to access multiple banks in a time interleaved fashion. Each memory bank has an associated memory bank manager, which is arranged to track the contents and egress ports associated with data stored in the memory bank. Incoming data from ingress traffic is evaluated and segregated based on criteria. One of the memory banks is identified based on the criteria, and the incoming data is stored in the identified memory bank in the next available write cycle timeslot. Data constructs in the memory bank manager are updated to indicate the location and egress port associated with the stored data. The memory bank managers submit egress transmit bids to a master scheduler, which controls access to the memory banks. The memory banks are read out and written to in an interleaved fashion such that the effective memory bandwidth increases with the number of memory banks and much higher ingress and egress traffic rates can be supported.

Example Operating Environment

Figure 1:
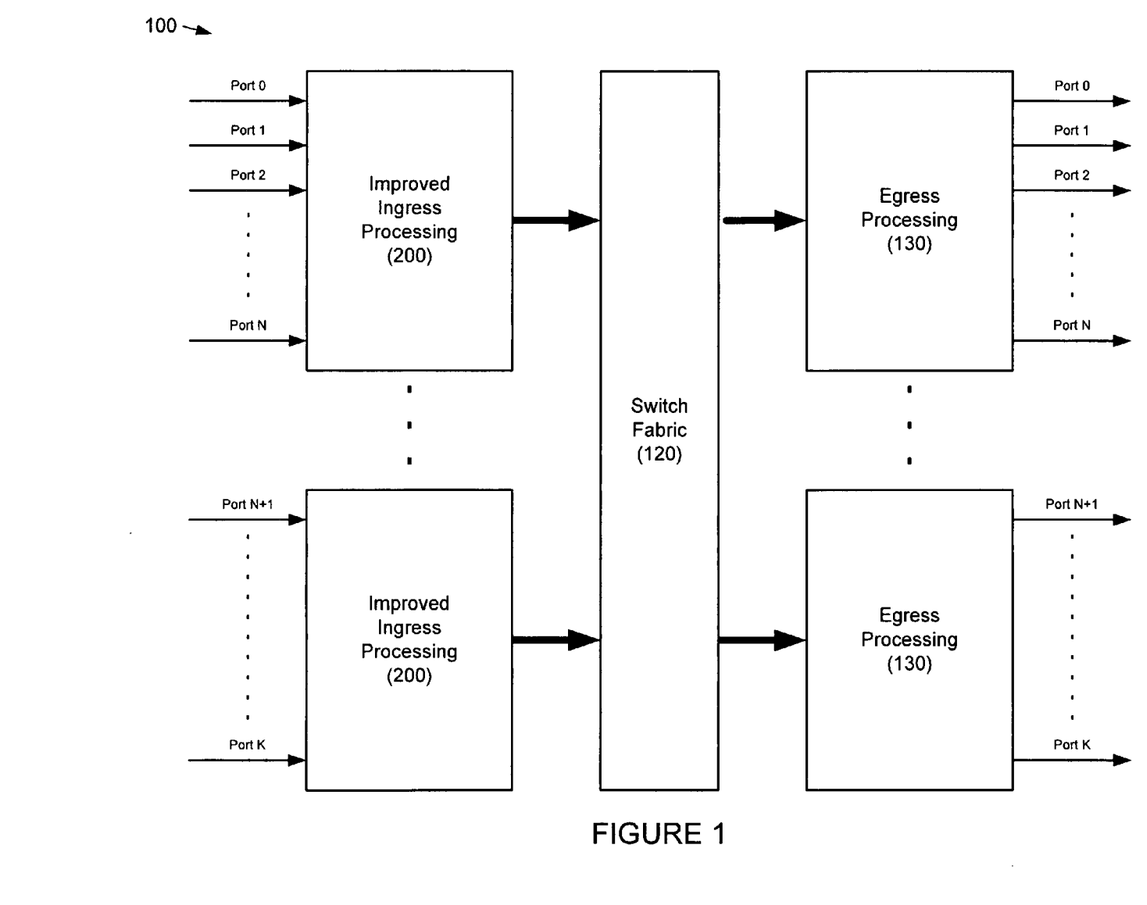
FIG. 1 is an illustration of an operating environment for an embodiment of the present invention.

FIG. 1 is an illustration of an operating environment (100) for an embodiment of the present invention. The example illustrated in FIG. 1 includes improved ingress processing blocks (200), a switch fabric (120), and egress processing blocks (130).

Each of the ingress processing blocks (200) includes multiple ingress ports (i.e., ports 0 through N, and ports N+1 through K) and an output port that is coupled to the switch fabric (120). The switch fabric (120) has a set of output ports that are coupled to the egress processing blocks (130). The egress processing blocks include multiple output ports (i.e., ports 0 through N, and ports N+1 through K).

The switch fabric is arranged to receive packets from the ingress processing blocks and couple the packets to one of the egress processing blocks based on the egress port number. As will become apparent from the descriptions that follow below, the improved ingress processing blocks (200) are arranged for efficient buffering.

Ingress Processing

Figure 2:
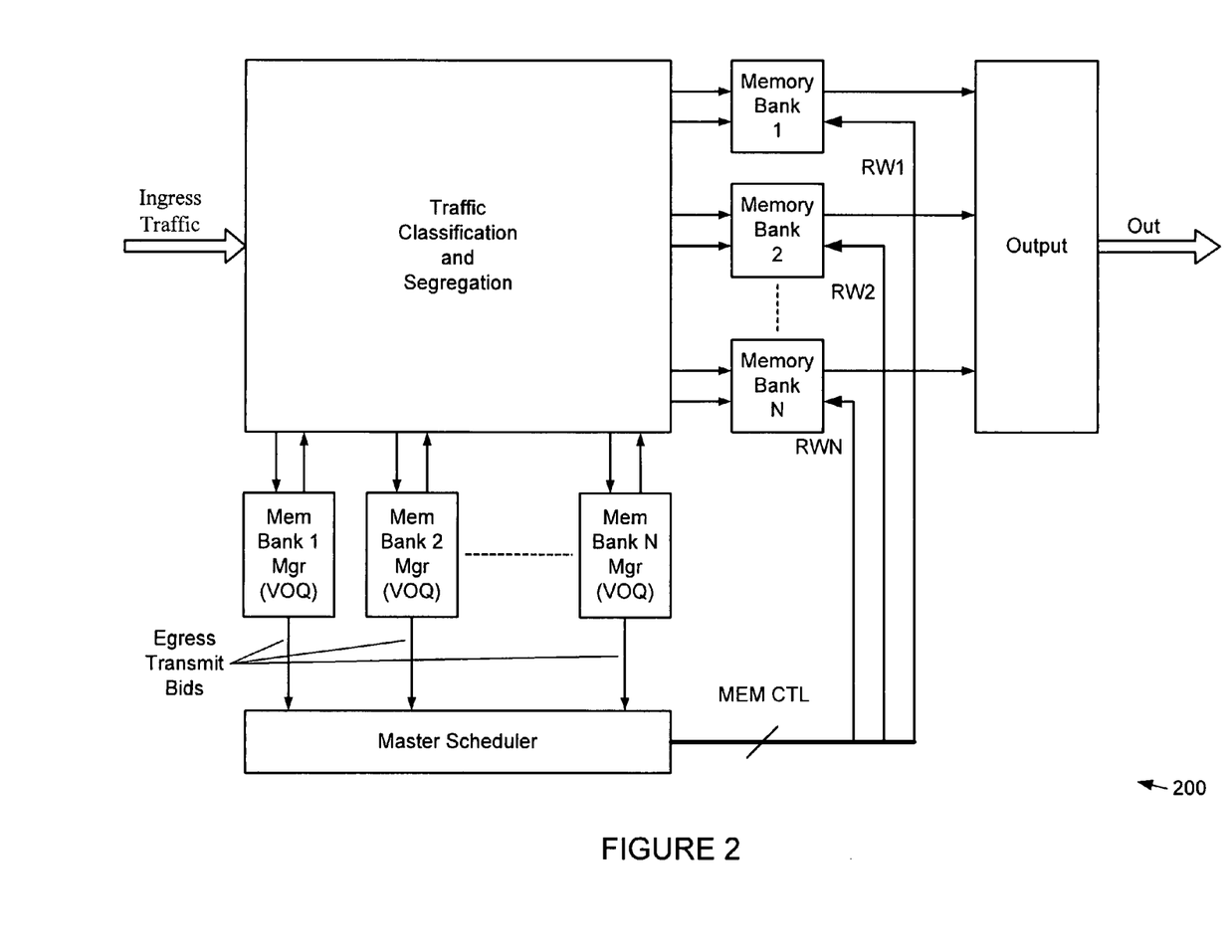
FIG. 2 is an illustration of an ingress processing block that is arranged according to an embodiment of the present invention.

FIG. 2 is an illustration of an ingress processing block (200) that is arranged according to an embodiment of the present invention. The example illustrated in FIG. 2 includes a traffic classification and segregation block, memory banks 1 through N, memory bank manager blocks 1 through N, a master scheduler block, and an output block.

The traffic classification and segregation block is in communication with the memory banks and the memory bank managers. The memory bank manager blocks are in communication with the master scheduler block. The master scheduler block is arranged to provide memory control signals (MEM CTL) to the memory banks. The output block is arranged to selectively couple data that is readout of the memory banks to the switch fabric (e.g., see FIG. 1).

The input data (ingress traffic) is segregated into streams that are each sent to different banks of memory (e.g., banks of DRAM). A variety of classification criteria may be used to segregate the traffic. Example classification criteria include: input port, priority level, source IP address, or a hash of interesting fields in the traffic headers. Although the incoming data can be classified according to any reasonable basis, the data that arrives at each memory bank is queued based on the egress port. Each Memory Bank Manager block (MBM) keeps track of a full set of VOQ's. For example, when the system includes K egress ports, each MBM includes K sets of VOQ's to track. The MBM's keep track of where to write the incoming network data (for its bank of memory) for each of the VOQ's. The MBM's submit Egress Transmit Bids to the Master Scheduler for each of the VOQ's that contain network traffic. The Master Scheduler selects a VOQ to transmit for each bank.

Figure 3A:
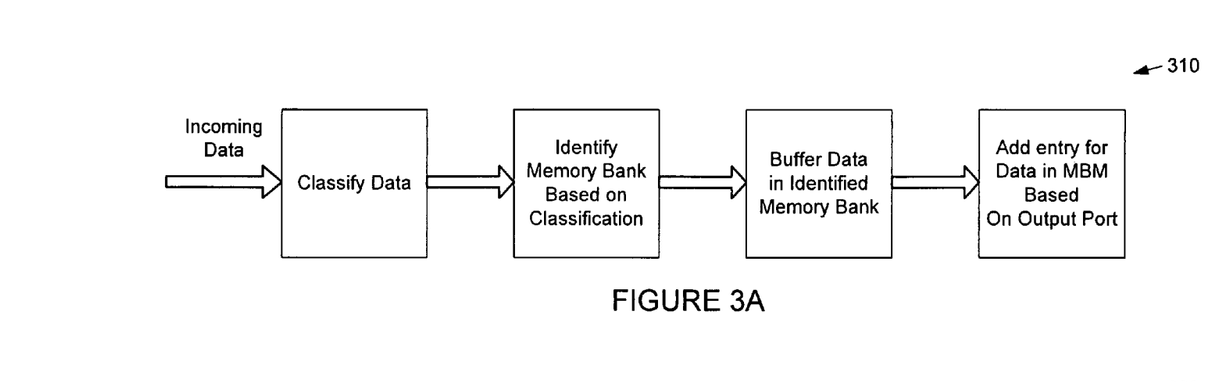
FIG. 3A is an illustration of a process flow for a traffic classification and segregation block that is arranged according to an example embodiment of the present invention.

FIG. 3A is an illustration of a process flow (310) for a traffic classification and segregation block that is arranged according to an example embodiment of the present invention. Incoming data (ingress traffic) is received by the traffic classification and segregation block. The data is classified according to criteria such as, for example, incoming port number, source IP address, a hash, as well as any other appropriate criteria. Based on the classification, a memory bank is identified, and the data is buffered in a queue associated with the identified memory bank. As previously described, the queues are organized according to egress ports. An entry is made in the MBM that is associated with the identified memory bank and the (now buffered) data, identifying the VOQ by the egress port. Each MBM is arranged to maintain a list, table, linked list, record, or some other data construct to associate data that is stored in the corresponding memory bank with particular VOQs.

Figure 3B:
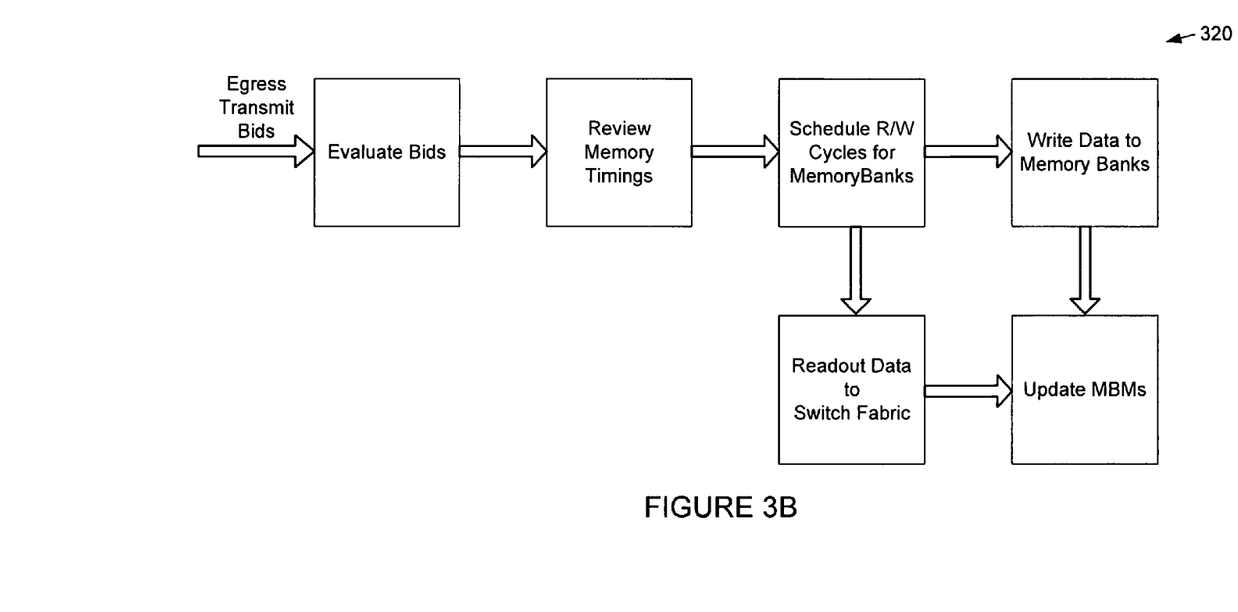
FIG. 3B is an illustration of a process flow for a master scheduler block that is arranged according to an example embodiment of the present invention.

The master scheduler block is responsible for maintaining fair access across all memory banks. FIG. 3B is an illustration of a process flow for a master scheduler block that is arranged according to an example embodiment of the present invention. The MBMs periodically submit bids (egress transmit bids) to the master scheduler (MS) for every VOQ that has network traffic. Since each bid identifies active VOQs, the master scheduler can evaluate the bids and provide scheduling operations for every egress port from every memory bank. The master scheduler reviews the memory timing requirements and schedules read and write access to each of the memory banks based on a priority scheduling. The master scheduler block can use additional information to make its scheduling decisions. For example, it may be desirable to limit the traffic to a given port. The Master scheduler can take "rate" information into account and artificially limit the output of a VOQ. The Master scheduler can also take egress credits into account or obey flow control for a given port. After the read and write scheduling is determined for a particular cycle, the memory control signals are set up and read and write cycles are initiated at the appropriate timings. Each of the data that are read or written are identified to the MBM for updating the data constructs or performing other reaping functions.

The above described systems and methods provide efficient use of the memory banks to improve throughput with less expensive memory than other systems. The timing of the read and write cycles of the ingress processing system illustrated in FIG. 2 are tightly controlled to optimize efficiency as will be described with reference to FIG. 4.

Memory Timings

Figure 4:
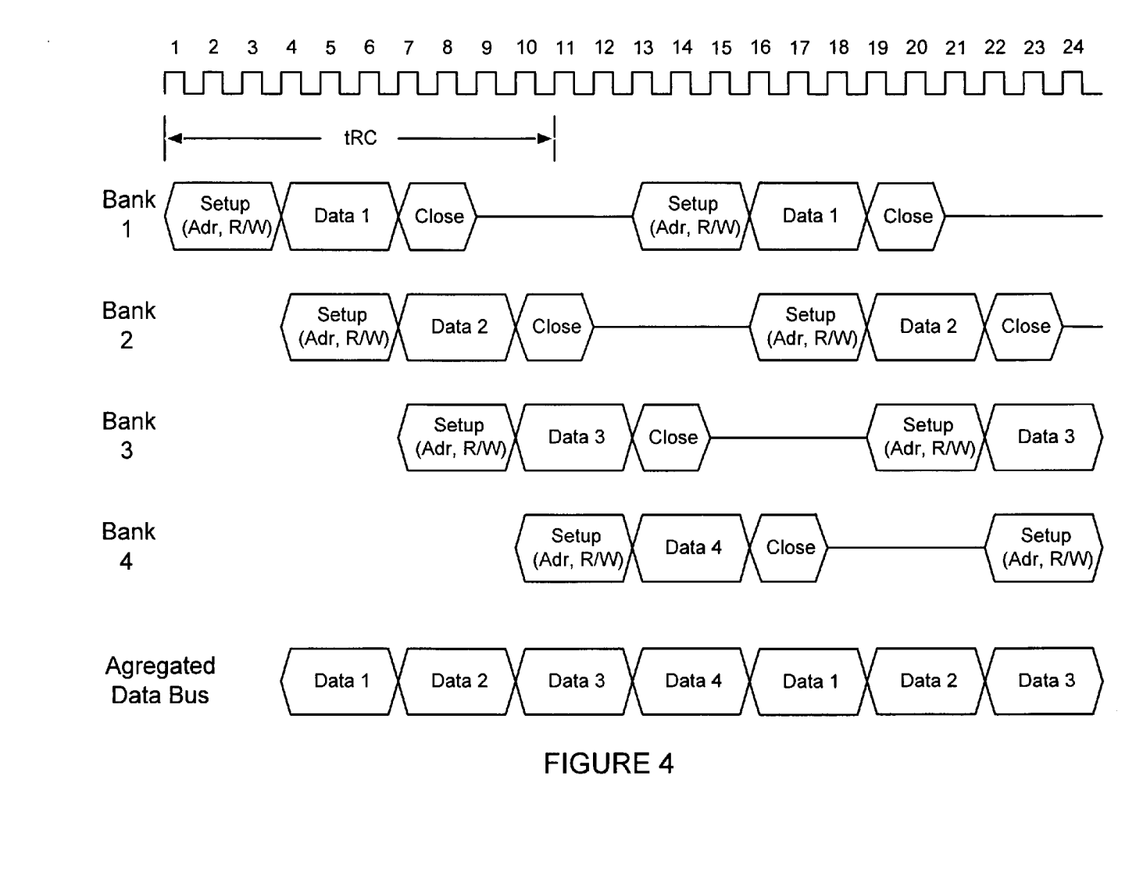
FIG. 4 is an illustration of memory timings for an example ingress processing block that is arranged according to an example embodiment of the present invention.

FIG. 4 is an illustration of memory timings for an example ingress processing block that is arranged according to an example embodiment of the present invention.

Modern random access memory (RAM) includes multiple banks of memory. Random Access Memory (RAM) is often chosen because of its speed and versatility. The most economical RAM (cost per bit) is Dynamic Random Access Memory (DRAM). The term DRAM is intended to include all types of dynamic RAM including, but not limited to, synchronous DRAM (SDRAM), double-data rate DRAM (DDR, DDR2), reduced latency DRAM (RLDRAM), fast cycle DRAM (FCRAM), as well as others.

There are certain limitations and restrictions that must be followed when using DRAM. The overhead associated with accessing DRAM is independent for each DRAM bank inside the chip(s). In particular, the minimum setup, access, and terminating access results in a minimum cycle time that must be maintained (tRC). For each bank, the setup time is associated with addressing the DRAM and asserting a read/write enable signal. The data read/write time is associated with asserting the data on the data bus that is associated with the bank within the DRAM. The terminating time is associated with closing the access to the DRAM with sufficient margin to ensure reliable memory read/writes. The overhead can eat up as much as 90% of the total bandwidth when the data (read or written) is small.

FIG. 4 illustrates memory timings that provide interleaved access to minimize the impact of the overhead associated with accessing a DRAM memory bank. The DRAM bus efficiency has been increased to 100% using this interleaved access procedure. Each DRAM bank has a "timeslot" in which to write or read network data. The master scheduler block correlates the "Bank-Time-Slot" availability with the egress transmit bids that are made by each MBM so that 100% bus efficiency can be maintained in the aggregated data bus. Each data that is available on the aggregate bus (i.e., Data 1, Data 2, Data 3, Data 4) may correspond to a single packet, multiple packets, or a portion of a packet.

The traffic arrival rate (TAR) is divided by the number of memory banks used in the system when the segregation criteria is based on the input port. In one example, twelve (12) network ports each have a TAR of 672 ns, yielding an aggregated TAR of 56 ns for all ports. However, when the system includes four (4) memory banks and the traffic from three (3) network ports is sent to each bank, the TAR for each bank increases from 56 ns to 224 ns. The increased TAR allows for efficient bus transfers and a narrower DRAM bus than a conventional ingress processing system (e.g., See FIG. 5).

FIG. 5 illustrates a conventional ingress processing block, where a section of RAM is allocated for each VOQ. When the TAR is much less than the random access memory bandwidth (of the RAM), then this conventional ingress buffering works fine. However, the TAR will increase as the conventional ingress buffering subsystem is required to buffer more ports or higher bandwidth ports. As the TAR increases, more accesses to DRAM need to be made and as a result, resulting in dramatic decreases in efficiency. In order to keep up with the bandwidth requirements the DRAM bus width needs to be increased, resulting in greatly increased expense.

Figure 6A:
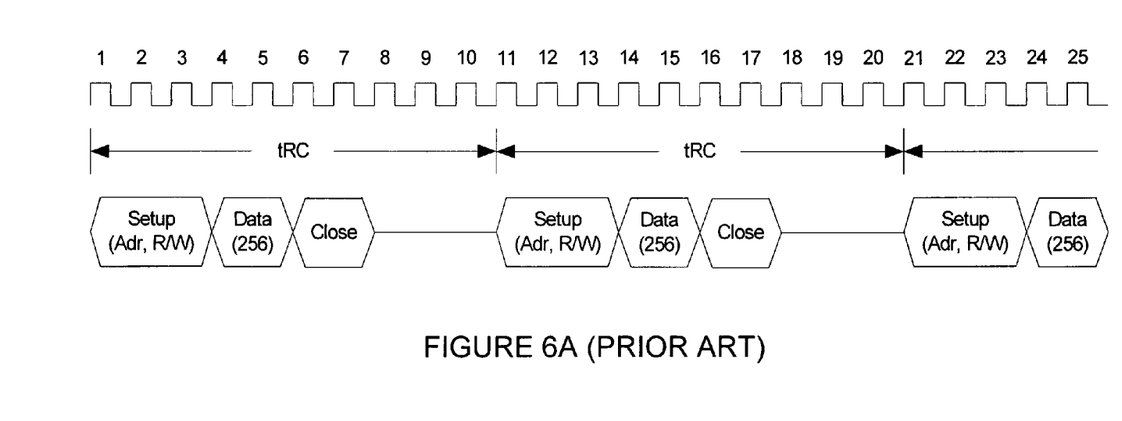
FIGS. 6A and 6B are illustrations of memory timings for a conventional ingress processing block.
Figure 6B:
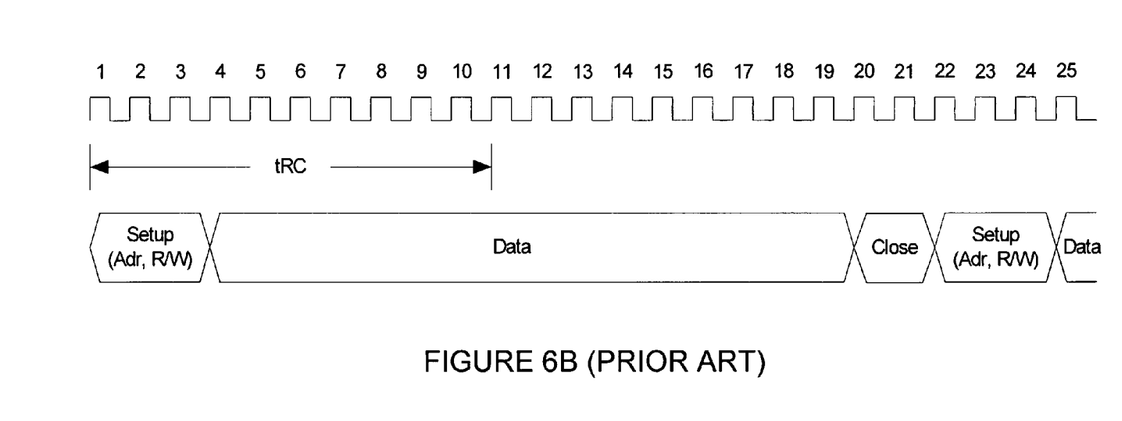

FIGS. 6A and 6B are illustrations of memory timings for the conventional ingress processing block of FIG. 5. FIG. 6A shows a series of small DRAM accesses where only 20% of the bus bandwidth is utilized and 80% of time it is idle. When the accesses are large, the overhead only consumes a small amount of the available bandwidth. FIG. 6B illustrates a large data access with 76% bus utilization (only 24% idle).

The above specification, examples and data provide a complete description of the manufacture and use of the composition of the invention. Since many embodiments of the invention can be made without departing from the spirit and scope of the invention, the invention resides in the claims hereinafter appended.

We claim:

1. A networking apparatus, comprising:
a traffic classifier and segregator that is configured to receive the incoming data via at least one port and classify incoming data to a plurality of memory banks each of which configured to independently store portions of the incoming classified data when write enabled and output portions of the stored data when read enabled;
a plurality of memory bank managers configured to track the portions of the incoming classified data stored in the plurality of memory banks via virtual output queues, each of which is associated with one of the plurality of memory banks; and
a master scheduler configured to receive egress transmit bids from the memory bank managers, wherein each of the egress transmit bids identifies an active one of the virtual output queues, and schedule, based on the egress transmit bids and a timeslot associated with each of the memory banks, read or write enable signals to the memory banks in an interleaved fashion.

2. The apparatus of claim 1, further comprising an output block that is configured to communicate output of one or more of the memory banks to the switch fabric when the one or more memory banks is enabled by the corresponding read enable signals.

3. The apparatus of claim 1, wherein the traffic classifier and segregator is configured to apply a criteria to the incoming data to determine an appropriate classification.

4. The apparatus of claim 3, wherein the criteria includes at least one of an input port designator, a priority level designator, a source IP address, or a hash of one or more fields in a traffic header.

5. The apparatus of claim 1, wherein each memory bank comprises a dual-ported dynamic random access memory (DRAM) and the master scheduler is further configured to simultaneously schedule write cycles and read cycles during the same one of the timeslots.

6. The apparatus of claim 5, wherein each DRAM has a minimum cycle time that is associated with accessing the DRAM, the minimum cycle time including a setup time that is associated with addressing the DRAM and asserting at least one of a read or write enable signal, and wherein the master scheduler is configured to interleave access to the memory banks such that the setup times associated with each DRAM occurs with a minimal latency.

7. The apparatus of claim 1, wherein the timeslot is assigned to each of the memory banks by the master scheduler, wherein each timeslot is associated with availability for accessing the respective memory bank.

8. The apparatus of claim 1, wherein each memory bank manager includes a data construct including a first field for a virtual output queue identifier and a second field for a memory address, wherein each virtual output queue identifier is associated with an egress port.

9. The apparatus of claim 8, wherein the data construct is selected from a table, a list, a linked list, or a record.

10. The apparatus of claim 1, wherein the master scheduler is further configured to retrieve the stored data from the memory banks and forward the stored data to the switch fabric.

11. The apparatus of claim 1, wherein the master scheduler is further configured to:
evaluate the egress transmit bids;
review memory timings for the plurality of memory banks;
schedule read cycles for the plurality memory banks based on the egress transmit bids such that each read cycle occurs in one of the timeslots for interleaved memory access;
and
report completion of the scheduled read cycles to the memory bank managers.

12. A method of buffering incoming data to a switch fabric, the method comprising:
receiving the incoming data via at least one port;
classifying the incoming data to a plurality of memory banks each of which is configured to independently store portions of the incoming classified data when write enabled and output portions of the stored data when read enabled;
tracking by a plurality of memory bank managers the portions of the incoming classified data stored in the plurality of memory banks via virtual output queues, each of which is associated with one of the plurality of memory banks;
receiving egress transmit bids from the memory bank managers, wherein each of the egress transmit bids identifies an active one of the virtual output queues; and
scheduling, based on the egress transmit bids and a timeslot associated with each of the memory banks, read or write enable signals to the memory banks in an interleaved fashion.

13. The method of claim 12, further comprising communicating output of one or more of the memory banks to the switch fabric when the one or more memory banks is enabled by the corresponding read enable signals.

14. The method of claim 12, further comprising applying a criteria to the incoming data to determine an appropriate classification.

15. The method of claim 14, wherein the criteria includes at least one of an input port designator, a priority level designator, a source IP address, or a hash of one or more fields in a traffic header.

16. The method of claim 12, wherein each memory bank comprises a dual-ported dynamic random access memory (DRAM), the scheduling further comprising simultaneously scheduling write cycles and read cycles during the same one of the timeslots.

17. The method of claim 16, wherein each DRAM has a minimum cycle time that is associated with accessing the DRAM, the minimum cycle time including a setup time that is associated with addressing the DRAM and asserting at least one of a read or write enable signal, and wherein the scheduling further comprises interleaving access to the memory banks such that the setup times associated with each DRAM occurs with a minimal latency.

18. The method of claim 12, further comprising assigning the timeslot to each of the memory banks, wherein each timeslot is associated with an availability for accessing the respective memory bank.

19. The method of claim 12, wherein each memory bank manager includes a data construct including a first field for a virtual output queue identifier and a second field for a memory address, wherein each virtual output queue identifier is associated with an egress port.

20. The method of claim 19, wherein the data construct is selected from a table, a list, a linked list, or a record.

21. The method of claim 12, further comprising retrieving the stored data from the memory banks and forwarding the stored data to the switch fabric.

22. The method of claim 12, further comprising:
evaluating the egress transmit bids;
reviewing memory timings for the plurality of memory banks;
scheduling read cycles for the plurality memory banks based on the egress transmit bids such that each read cycle occurs in one of the timeslots for interleaved memory access; and
reporting completion of the scheduled read cycles to the memory bank managers.

* * * * *